March 12, 1957  J. TOPPARI  2,785,350
CAPACITOR
Filed Oct. 18, 1954

INVENTOR.
John Toppari
BY
Ralph Hammar
Attorney

United States Patent Office 2,785,350
Patented Mar. 12, 1957

2,785,350
CAPACITOR

John Toppari, Erie, Pa., assignor to Erie Resistor Corporation, Erie, Pa., a corporation of Pennsylvania Application October 18, 1954, Serial No. 462,903

3 Claims. (Cl. 317—242)

In tubular soldered ceramic capacitors having fired on silver coatings with a soldered lead extending through the bore of the tube there is a tendency for the silver to pull away from the inner surface of the ceramic tube upon heat cycling due to differences in the coefficient of thermal expansion. When the inner silver coating pulls away from the ceramic there is a drop in capacitance because the ceramic has a dielectric constant many times that of air. This invention is intended to overcome this problem by making the inner surface of the electrode non-adherent to solder and by confining the soldered connection to the ends.

Figure 1:
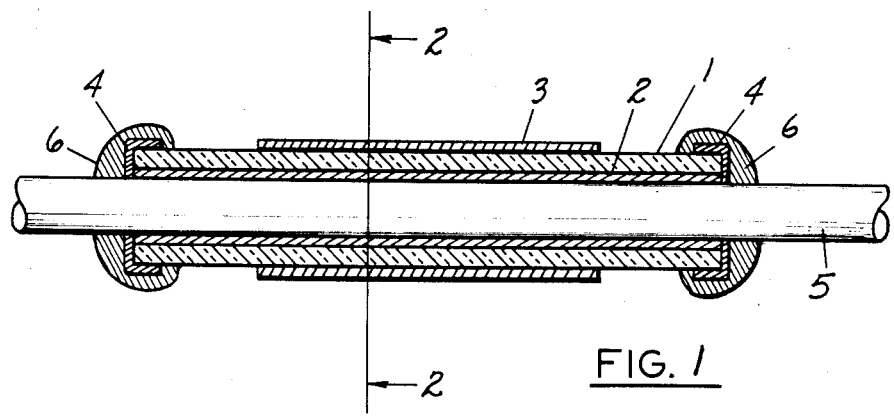
Figure 2:
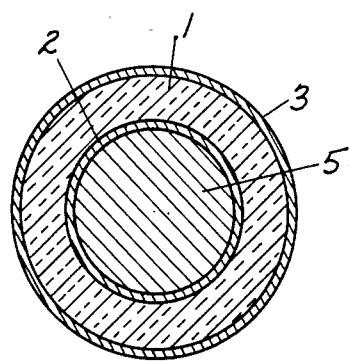
Figure 3:
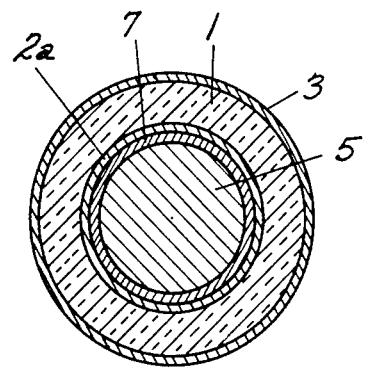

In the accompanying drawing, Fig. 1 is a longitudinal section through a ceramic capacitor, Fig. 2 is a section on line 2—2 of Fig. 1, and Fig. 3 is a corresponding section of a modification.

In the drawing, 1 indicates a tubular ceramic capacitor dielectric having on its inner and outer surfaces fired on metal electrode coatings 2 and 3. Ordinarily, the inner electrode coating 2 will overlap each end as indicated at 4. Extending through the bore of the ceramic tube is a lead 5 which is soldered to the inner electrode coating extensions 4 by a solder bead 6 usually formed by dip soldering. If the electrode coating 2 and the extensions thereof indicated at 4 were all of the solder adherent type, there would inevitably be some creepage of the solder 6 between the lead 5 and the inner surface of the electrode coating 2 and upon heat cycling of the capacitor throughout the normal range of −50° C. to +85° C. the differences in thermal expansion would tend to pull the inner electrode coating 2 away from the inner surface of the ceramic dielectric 1 thereby introducing an air dielectric between the electrode and the ceramic and materially lowering the capacity since the ceramic dielectric ordinarily has a dielectric constant many times that of air. The pulling away of the inner electrode coating 2 has been a serious problem in this type of condenser because even the condensers which passed the heat cycling test at the point of manufacture might still be susceptible to the same type of failure in service and until the inner electrode coating actually pulls away from the inner surface of the ceramic dielectric there is no way of telling the capacitor from a perfect capacitor where there was no tendency for the inner electrode to pull away from the dielectric. This problem arises only in the case of the inner electrode 2 and does not arise in the case of the outer electrode 3 which is in effect shrunk on to the outer surface of the ceramic.

Fig. 2 shows one expedient for preventing the pulling away of the inner electrode 2. In this arrangement, the inner electrode 2 is a fired on silver paint which by reason of the addition of from 1 to 3% of zirconium oxide produces a fired silver film to which solder will not adhere. The other ingredients of the silver paint are conventional comprising a finely divided silver pigment and a ceramic flux or low melting point glass which produces the mechanical bond of the silver pigment to the ceramic upon firing. At the firing temperature, the ceramic flux fuses and the silver pigment particles sinter together to provide a uniform silver coating. As is shown in Fig. 1, the coating 2 of silver to which solder will not adhere is confined to the bore of the ceramic tube. On the ends of the tube as indicated by the reference numeral 4, there is subsequently fired on a silver coating to which solder will adhere. In this paint there is an addition of bismuth oxide or bismuth subnitrate to the ceramic flux which makes the silver film resulting from firing one to which solder will adhere. The characteristics of the silver coating forming the outer electrode 3 are not critical since no soldered connection is to be made to the outer electrode. Paints having the characteristics of solder adherence or non-adherence are known in the art and the specific paint formulations disclosed are merely typical.

Another construction for preventing solder adherence to the inner electrode coating 2 is shown in Fig. 3 where the inner electrode coating 2a is a fired on silver coating of the type which can be subsequently electro-plated with a copper coating 7. Fired on silver coatings which can be electro-plated are well known. The copper electro-plating 7 is performed after the firing of the inner electrode 2a which as in Fig. 1 is confined to the bore of the ceramic tube. Subsequently, end coatings 4 of silver paint which when fired produce a coating to which solder will adhere are applied and fired on. During the firing of the coatings 4 which takes place in an oxidizing atmosphere, the inner or exposed surface of the electro-plated copper coating 7 is oxidized and the oxidized form will not adhere to solder. Accordingly, when the ends of the capacitor are dipped to provide the solder connections indicated at 6, there is no tendency for the solder to creep between the lead 5 and the inner electrode coating 2a and in any event there can be no bonding of the lead to the inner electrode 2a by the solder. While the Fig. 3 construction requires an additional step, it produces the same result as the Fig. 1 and 2 construction, namely, of preventing a soldered connection between the lead and the inner electrode on the bore of the ceramic dielectric tube. When there is no soldered connection between the lead and the inner electrode, heat cycling has no tendency to cause the inner electrode to pull away from the inner surface of the bore of the ceramic tube and, accordingly, does not in any way affect the resultant capacitance. Either of the expedients achieves the same end result, namely, the prevention of a soldered connection between the lead and the inner electrode on the bore of the ceramic dielectric.

What is claimed as new is:

1. A feed through capacitor comprising a ceramic dielectric tube, a fired on metal electrode on the inner surface of the bore of the tube, said electrode having an exposed inner surface with the property of not adhering to solder, a lead extending through the bore of the tube, fired on solder adherent metal coatings on the ends of the tube and forming extensions of said first coating, a solder connection between the lead and the coatings on the ends of the tube, and a metal electrode coating on the outside of the tube overlapping the first electrode to provide the desired capacity.

2. The capacitor of claim 1 in which the metal electrode on the bore of the tube comprises a coating of silver fired on the ceramic and a layer of copper oxide on the inner surface of the silver which prevents adherence of solder to the electrode and in which the solder adherent metal coatings on the ends of the tube and the metal electrode on the outside of the tube are fired on silver.

3. A feed through capacitor comprising a ceramic dielectric tube, a metal electrode coating of fired on silver on the bore of the tube having an addition of zirconium oxide to prevent adherence of solder, a lead extending through the bore of the tube, solder adherent metal coatings on the ends of the tube and forming extensions of the first coating, a solder connection between the lead and the coatings on the ends of the tube, and a metal electrode coating on the outside of the tube overlapping the first electrode to provide the desired capacity.

References Cited in the file of this patent

UNITED STATES PATENTS

| | | |
|---|---|---|
| 2,305,849 | Dorn | Dec. 22, 1942 |
| 2,603,675 | Binek | July 15, 1952 |

FOREIGN PATENTS

| | | |
|---|---|---|
| 533,862 | Great Britain | Feb. 21, 1941 |